United States Patent
Lee et al.

(10) Patent No.: US 10,508,576 B2
(45) Date of Patent: Dec. 17, 2019

(54) UREA-FILLING DEVICE FOR DIESEL VEHICLES

(71) Applicants: Hyundai Motor Company, Seoul (KR); Kia Motors Corporation, Seoul (KR)

(72) Inventors: Tae Yoon Lee, Seoul (KR); Seung Hoon Choi, Seoul (KR); Sung Won Lee, Hwaseong-si (KR); June Young Park, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 78 days.

(21) Appl. No.: 15/791,067

(22) Filed: Oct. 23, 2017

(65) Prior Publication Data
US 2018/0230881 A1    Aug. 16, 2018

(30) Foreign Application Priority Data
Feb. 15, 2017  (KR) ........................ 10-2017-0020362

(51) Int. Cl.
*F01N 3/20* (2006.01)
*B60K 15/04* (2006.01)

(52) U.S. Cl.
CPC ............ *F01N 3/2066* (2013.01); *B60K 15/04* (2013.01); *F01N 2610/02* (2013.01); *F01N 2610/1413* (2013.01); *F01N 2610/1473* (2013.01); *Y02A 50/2325* (2018.01); *Y02T 10/24* (2013.01)

(58) Field of Classification Search
CPC ............ B60K 15/04; B60K 2015/0474; F01N 2610/1473; F01N 2610/02; F01N 2610/1413; F01N 3/2066
See application file for complete search history.

(56) References Cited

U.S. PATENT DOCUMENTS

| | | | |
|---|---|---|---|
| 7,913,722 B2 * | 3/2011 | Dorst | B63B 17/00 137/312 |
| 8,910,620 B2 | 12/2014 | Kraus | |
| 8,960,473 B2 | 2/2015 | Grun et al. | |
| 2014/0202593 A1 | 7/2014 | Doutear-Poirous et al. | |
| 2018/0105035 A1 * | 4/2018 | Radu | B60K 15/04 |

FOREIGN PATENT DOCUMENTS

| | | |
|---|---|---|
| EP | 2 340 956 B1 | 5/2013 |
| JP | H05-330351 A | 12/1993 |
| KR | 10-1518938 B1 | 5/2015 |
| KR | 10-1567229 B1 | 11/2015 |
| WO | WO 2016/015918 A1 | 2/2016 |

* cited by examiner

*Primary Examiner* — Timothy P. Kelly
(74) *Attorney, Agent, or Firm* — Morgan, Lewis & Bockius LLP (57) ABSTRACT

A urea-filling device for diesel vehicles may include a urea-overflow-preventing space formed in a portion of a urea filler neck to temporarily accommodate urea flowing backwards from a urea tank, easily preventing urea from overflowing out of the urea filler neck.

8 Claims, 6 Drawing Sheets

UREA-FILLING DEVICE FOR DIESEL VEHICLES

CROSS-REFERENCE TO RELATED APPLICATION

The present application claims priority to Korean Patent Application No. 10-2017-0020362 filed on Feb. 15, 2017, the entire contents of which is incorporated herein for all purposes by the present reference.

BACKGROUND OF THE INVENTION

Field of the Invention

The present invention relates to a urea-filling device for diesel vehicles. More particularly, the present invention relates to a urea-filling device for diesel vehicles, which is configured for easily preventing urea from overflowing out of a filler neck from a urea tank when the urea tank is completely filled with the urea.

Description of Related Art

In general, an exhaust system of a diesel engine is provided with a selective catalytic reduction (SCR) system for injecting urea to an exhaust pipe to effectively remove nitrogen oxides.

Urea is decomposed into a plurality of molecules of ammonia by exhaust heat, and the ammonia reacts with nitrogen oxides contained in emissions, whereby harmless nitrogen and water, as products of the reaction, are discharged to the outside.

Therefore, diesel vehicles (specifically, commercial vehicles) are provided with a urea tank, which is filled with urea, as well as a diesel fuel tank, which is filled with diesel fuel.

Figure 1:
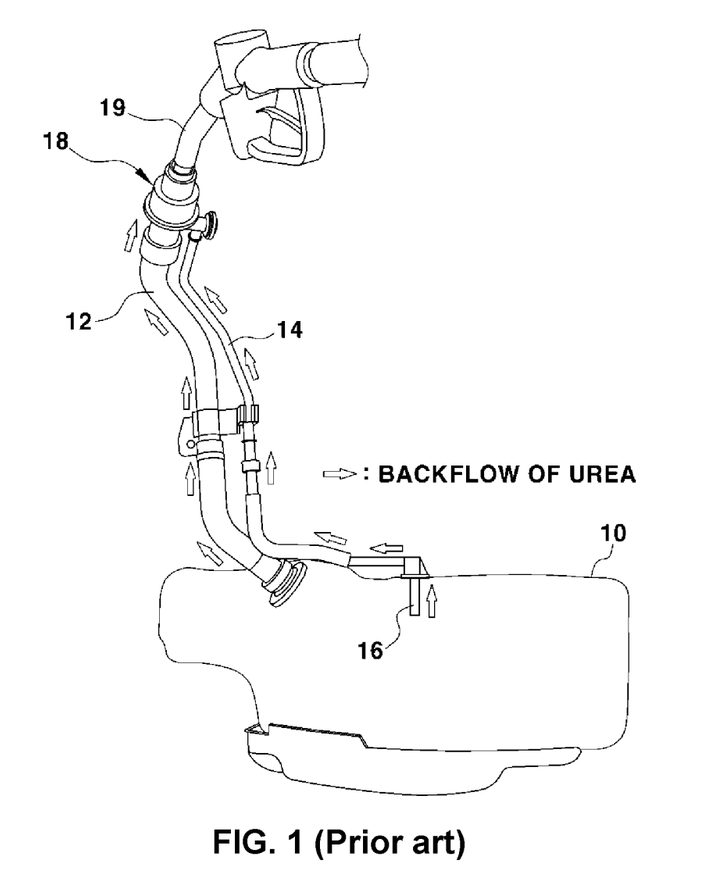
FIG. 1 is a schematic view illustrating the construction of a conventional urea-filling device.

Referring to FIG. 1, a conventional urea-filling device is constructed such that a urea injection line 12 and a leveling line 14 are connected to a urea tank 10, and a leveling pipe 16 is connected to the lower end portion of the leveling line 14 and extends into the urea tank 10.

The urea injection line 12 and the leveling line 14 are coupled at the upper end portions thereof with a filler neck 18, into which a urea injection gun 19 is inserted.

When the urea injection gun 19 is inserted into the filler neck 18 and is then operated, urea flows through the urea injection line 12 and is injected into the urea tank 10.

When the urea injected into the urea tank 10 reaches the leveling pipe 16, the urea tank 10 is completely filled with urea.

The leveling pipe 16 is configured to induce the internal pressure in the urea tank 10 toward the leveling line 14 and the filler neck 18 so that the urea tank 10 can be easily filled with urea.

When the urea tank 10 is completely filled with urea in a state in which the urea injection gun 19 is inserted into the filler neck 18, the pressure in the urea tank 10 sharply rises, which causes the urea in the urea tank 10 to be pushed to the filler neck 18 and to overflow out of the filler neck 18.

Of course, when the urea that flows backwards to the filler neck 18, after the urea tank 10 has been filled therewith, blocks a detecting hole formed in a distal end portion of the urea injection gun 19, the injection operation of the urea injection gun 19 is automatically stopped, whereby urea is not supplied to the urea tank any longer.

However, although the injection operation of the urea injection gun 19 has been stopped, when the urea injection gun 19 is removed from the filler neck 18, the increased pressure in the urea tank 10 is still applied, and consequently, a portion of the urea that has been pushed to the filler neck 18 from the urea tank 10 overflows out of the filler neck 18. Further, the urea that has overflowed out of the filler neck 18 is crystallized into white crystals, and the crystallized urea contaminates the surface of the vehicle body.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a urea-filling device for diesel vehicles, in which a urea-overflow-preventing space is formed in a portion of a urea filler neck to temporarily accommodate urea flowing backwards from a urea tank, easily preventing urea from overflowing out of the urea filler neck.

Various aspects of the present invention are directed to providing a urea-filling device for diesel vehicles including a urea filler neck having a urea-injection-gun insertion hole formed in an upper portion thereof and connected at a lower portion thereof with a urea injection line and a leveling line, and a urea-overflow-preventing space formed in the urea filler neck to temporarily accommodate urea that flows backwards from a urea tank.

In an exemplary embodiment, the urea filler neck may include an upper case including the urea-injection-gun insertion hole formed in a portion thereof and an upper cover formed at an opposite portion thereof to form the urea-overflow-preventing space, a lower case including a urea injection hole formed in a portion thereof to be connected to the urea injection line and a lower cover formed at an opposite portion thereof to be connected to the leveling line and to form the urea-overflow-preventing space, and a urea guide pipe mounted in the urea injection hole to guide urea flowing backwards through the urea injection line from the urea tank to the urea-overflow-preventing space.

In another exemplary embodiment, the urea guide pipe may have a urea guide wing integrally formed on an upper end portion thereof and the urea guide wing is bent vertically downwards therefrom to face toward the urea-overflow-preventing space.

In still another exemplary embodiment, the lower case may further include a partition wall integrally formed at a bottom thereof to separate the urea injection hole and the urea-overflow-preventing space from each other.

In yet another exemplary embodiment, the partition wall may have a urea-passing hole formed in an upper end portion thereof for the urea injection hole and the urea-overflow-preventing space to communicate with each other.

In still yet another exemplary embodiment, the urea guide pipe may be formed to have a smaller diameter than a diameter of an upper end portion of the urea injection hole so that a return gap is between an external circumferential surface of the urea guide pipe and an internal circumferential surface of the upper end portion of the urea injection hole.

In a further exemplary embodiment, the lower case may have a stepped recess formed in an upper end portion thereof, and the urea guide pipe may have a support protrusion formed at an upper end portion thereof to be seated on the stepped recess.

In another further exemplary embodiment, the upper case may be provided with an injection gun guide pipe inserted into a lower end portion of the urea-injection-gun insertion hole to guide insertion of the urea injection gun.

In still another further exemplary embodiment, the injection gun guide pipe may have a pressing end portion integrally formed at an external periphery of a lower end portion thereof to press the support protrusion of the urea guide pipe.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes, will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2A:
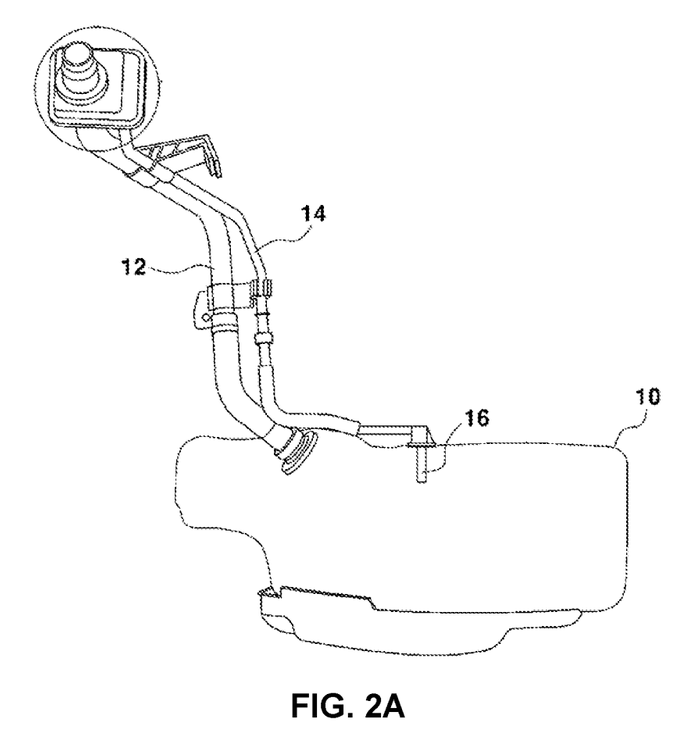
FIGS. 2A and 2B are perspective views illustrating a urea-filling device for diesel vehicles according to an exemplary embodiment of the present invention.
Figure 2B:
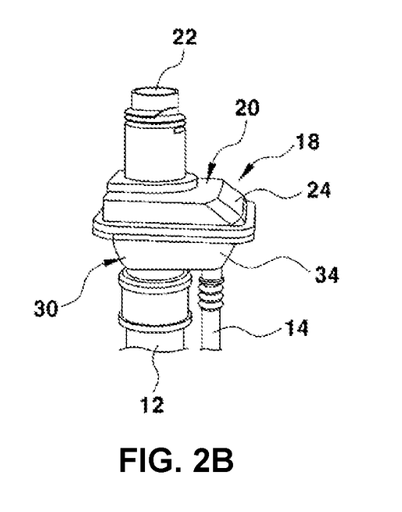
Figure 3:
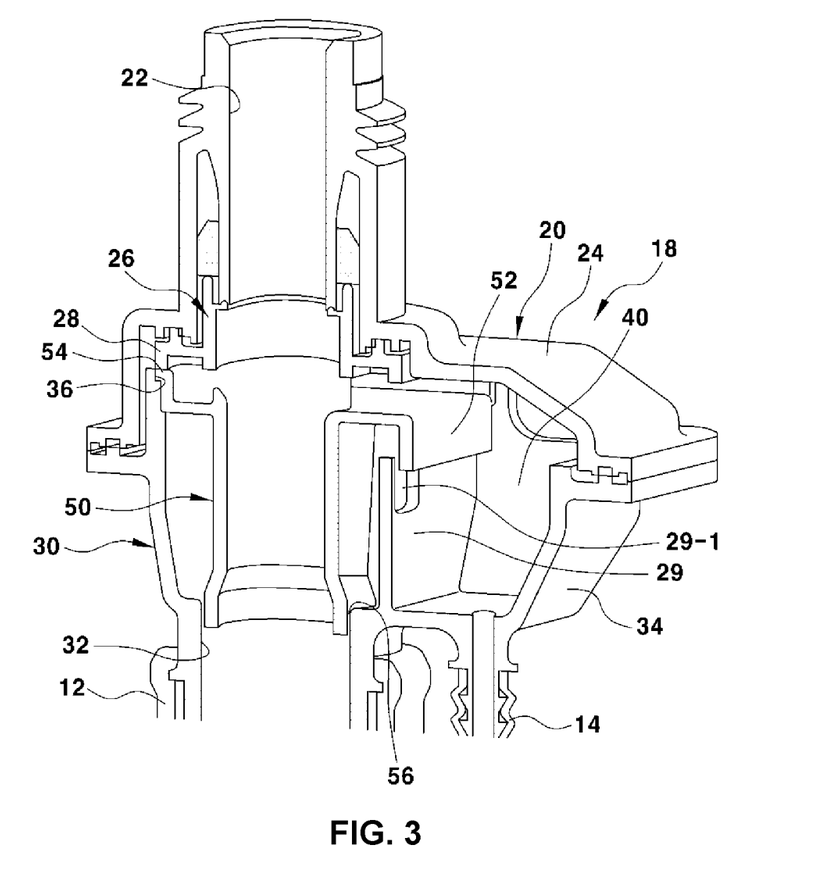
FIG. 3 is a sectional perspective view illustrating the urea-filling device for diesel vehicles according to an exemplary embodiment of the present invention.

FIGS. 2A and 2B and FIG. 3 are views illustrating a urea-filling device for diesel vehicles according to an exemplary embodiment of the present invention. In each figure, reference numeral 10 denotes a urea tank.

The urea tank 10 is connected to a urea injection line 12 and a leveling line 14, and the leveling line 14 is connected at the lower end portion thereof with a leveling pipe 16, which extends into the urea tank 10.

Further, the urea injection line 12 and the leveling line 14 are coupled at the upper end portions thereof with a urea filler neck 18, into which a urea injection gun 19 is inserted.

When the urea injection gun 19 is inserted into the filler neck 18 and is then operated, urea flows through the urea injection line 12 and is injected into the urea tank 10.

Meanwhile, when the urea tank 10 is completely filled with urea in the state in which the urea injection gun 19 is inserted into the filler neck 18, the pressure in the urea tank 10 rises sharply, which causes the urea in the urea tank 10 to flow backwards to the filler neck 18 and to overflow out of the filler neck 18.

The present invention is characterized in that urea, which flows backwards to the filler neck 18 from the urea tank 10, is prevented from overflowing out of the filler neck 18.

To the present end, the urea filler neck 18 has a urea-overflow-preventing space 40 formed in a portion thereof, which is configured to temporarily accommodate urea flowing backwards from the urea tank 10 and to return the urea to the urea tank 10.

To form the urea-overflow-preventing space 40, the filler neck 18 includes an upper case 20 and the lower case 30, which is bonded to or assembled with the upper case 20, and further includes a urea guide pipe 50 which is mounted in the lower case 30.

The upper case 20 includes a urea-injection-gun insertion hole 22 formed in a portion thereof into which the urea injection gun is inserted, and an upper cover 24 formed at the opposite portion thereof to form the urea-overflow-preventing space.

The lower case 30 includes a urea injection hole 32 formed in a portion thereof that is aligned with the urea-injection-gun insertion hole 22 in the vertical direction, and a lower cover 34 formed at the opposite portion thereof to form the urea-overflow-preventing space.

As a result of the upper case 20 and the lower case 30 being assembled with each other, the urea-overflow-preventing space 40 is formed between the upper cover 24 and the lower cover 34.

The upper end portion of the urea injection line 12 is connected to the lower end portion of the urea injection hole 32 in the lower case 30, and the upper end portion of the leveling line 14 is connected to the bottom portion of the lower cover 34.

The upper case 20 is provided with an injection gun guide pipe 26, which is inserted into the lower end portion of the urea-injection-gun insertion hole 22 to ensure the straight insertion of the urea injection gun 19, and the injection gun guide pipe 26 has a pressing end portion 28, which integrally or monolithically protrudes from the external periphery of the lower end portion of the injection gun guide pipe 26 to press a support protrusion 54 of the urea guide pipe 50, which will be described later.

The urea guide pipe 50 is mounted in the urea injection hole 32 in the lower case 30 and is configured to guide the urea, which flows backwards through the urea injection line 12 from the urea tank 10, to the urea-overflow-preventing space 40.

Further, the urea guide pipe 50 has a urea guide wing 52, which is integrated with and bent vertically downwards from the upper end portion of the urea guide pipe 50 to face toward the urea-overflow-preventing space 40. The urea, which flows backwards through the urea injection line 12 from the urea tank 10, smoothly flows to the urea-overflow-preventing space 40 via the urea guide wing 52.

The urea guide pipe 50 is formed to have a smaller diameter than the diameter of the upper end portion of the urea injection hole 32 in the lower case 30. Therefore, a return gap 56 is formed between the external circumferential surface of the urea guide pipe 50 and the internal circumferential surface of the upper end portion of the urea injection hole 32.

When the increased pressure in the urea tank 10 is released, a portion of the urea, which is temporarily accommodated in the urea-overflow-preventing space 40, flows over a partition wall 29 and returns to the urea tank 10 through the urea injection line 12 via the return gap 56, which will be described in detail later.

The partition wall 29 integrally extends upwards from the bottom portion of the lower case 30 to serve as a boundary between the urea injection hole 32 and a urea-overflow-preventing space 40. Therefore, the urea injection hole 32 and the urea-overflow-preventing space 40 become respectively independent spaces. The partition wall 29 prevents the urea, which flows backwards to the urea-overflow-preventing space 40 through the leveling line 14 from urea tank 10, from directly flowing to the urea injection hole 32.

When the partition wall 29 is not present, the urea, which flows backwards to the urea-overflow-preventing space 40 through the leveling line 14 from the urea tank 10, directly meets the urea that flows backwards to the urea injection hole 32, preventing the urea-overflow-preventing space 40 from functioning properly. For the present reason, the partition wall 29 extends upwards from the bottom portion of the lower case 30 as a boundary between the urea injection hole 32 and the urea-overflow-preventing space 40.

The partition wall 29 has a urea-passing hole 29-1 formed in an upper end portion thereof to facilitate communication of the urea injection hole 32 and the urea-overflow-preventing space 40 with each other. When the urea-overflow-preventing space 40 is completely filled with urea, the urea-passing hole 29-1 has a function of guiding a portion of the urea to the return gap 56.

To secure the urea guide pipe 50 to the internal of the lower case 30, the lower case 30 has a stepped recess 36 formed in the upper end portion thereof, and the urea guide pipe 50 has a support protrusion 54 extending outwards from the upper end portion thereof in the radial direction to be seated on the stepped recess 36.

As a result of the support protrusion 54 of the urea guide pipe 50 being seated on the stepped recess 36 in the upper end portion of the lower case 30, the urea guide pipe 50 is coupled to the internal of the lower case 30.

Further, the pressing end portion 28 of the injection gun guide pipe 26, which is inserted into the lower end portion of the urea-injection-gun insertion hole 22 in the upper case 20, presses the top portion surface of the support protrusion 54 of the urea guide pipe 50, further securely coupling the urea guide pipe 50 to the internal of the lower case 30.

Hereinafter, the operational effects of the urea-filling device for diesel vehicles of the present invention having the above-described construction will be described with reference to FIG. 4, FIG. 5 and FIG. 6.

First, the urea injection gun 19 is inserted into the urea-injection-gun insertion hole 22 in the upper case 20 so that urea is supplied to the urea tank 10 through the urea injection line 12.

Figure 4:
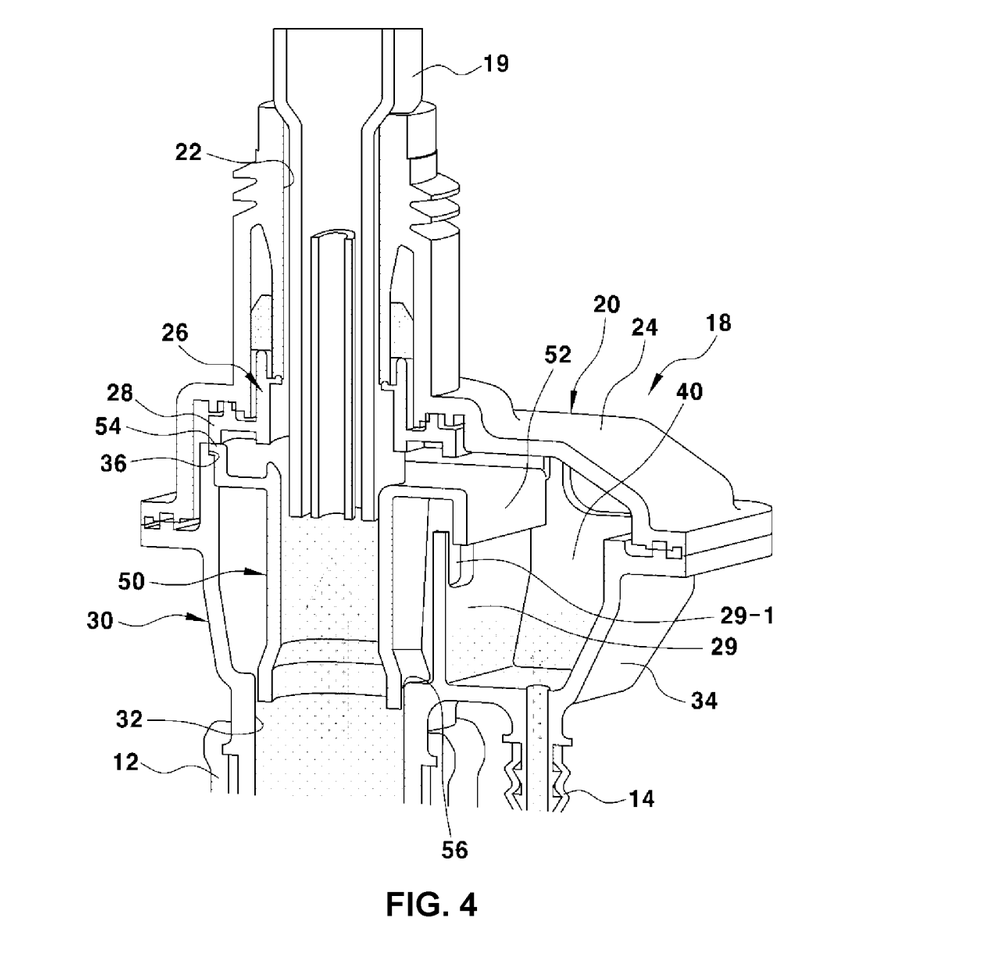
FIG. 4, FIG. 5 and FIG. 6 are cross-sectional views sequentially illustrating the process in which urea flows to a urea-overflow-preventing space in a filler neck in the urea-filling device for diesel vehicles according to an exemplary embodiment of the present invention.

When the urea tank 10 is completely filled with urea, the pressure in the urea tank 10 rises sharply, and accordingly, the urea in the urea tank 10 flows backwards to the urea guide pipe 50 through the urea injection line 12 (refer to FIG. 4).

At the present time, a small amount of urea flows backwards to the urea-overflow-preventing space 40 through the leveling line 14 from the urea tank 10.

Subsequently, when the urea, which flows backwards to the urea guide pipe 50, touches the detecting hole formed in the lower end portion of the urea injection gun 19, the injection operation of the urea injection gun 19 is automatically stopped and urea is not supplied to the urea tank any longer.

Figure 5:
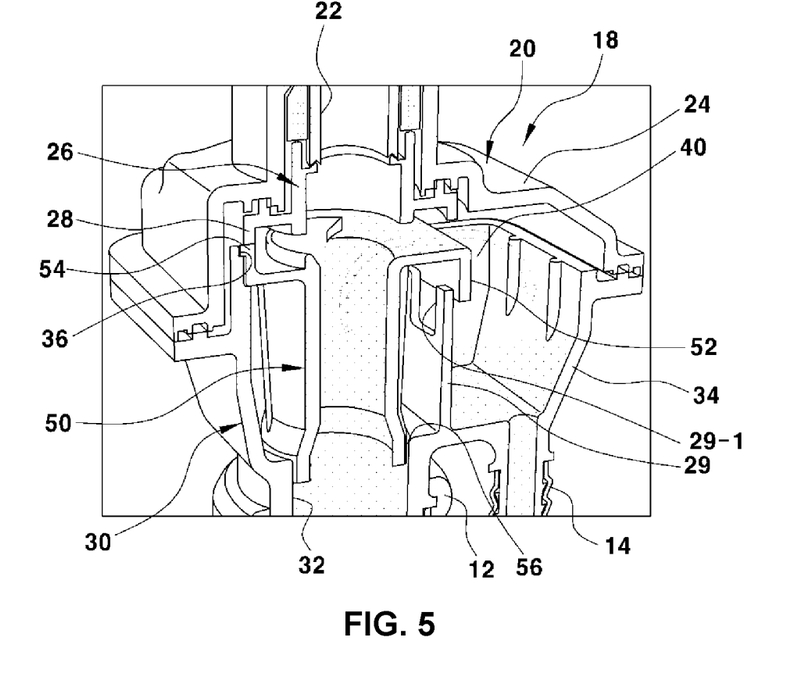

The urea, which flows backwards to the urea guide pipe 50, does not overflow out of the filler neck 18, but flows to the urea-overflow-preventing space 40 via the surface of the urea guide wing 52, which is formed at the upper end portion of the urea guide pipe 50 (refer to FIG. 5).

Accordingly, owing to the urea-overflow-preventing space 40, into which the urea flowing backwards from the urea tank 10 is introduced, it is possible to easily prevent the urea from overflowing out of the filler neck 18 and consequently to prevent the surface of the vehicle body from being contaminated by the urea that has overflowed out of the filler neck 18.

Figure 6:
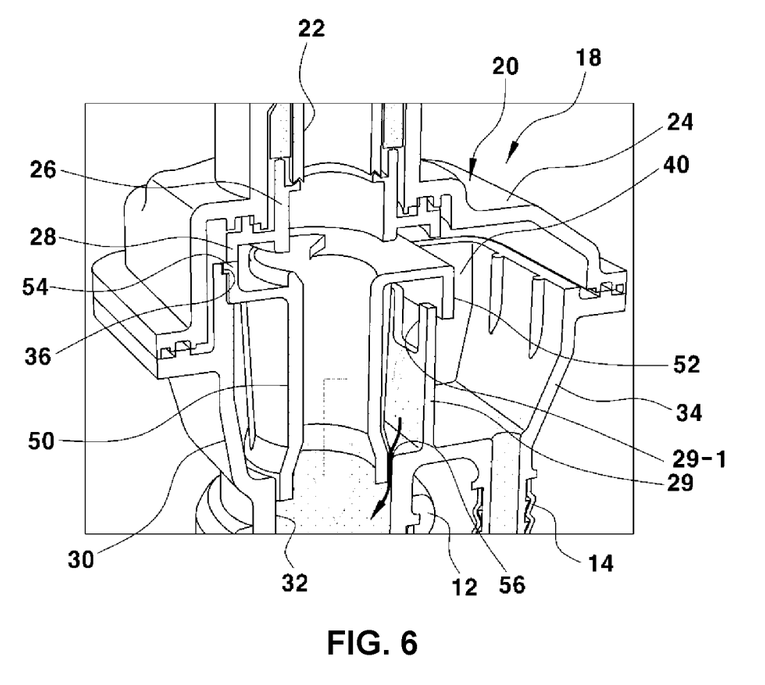

On the other hand, when the sharp increase in the pressure in the urea tank 10 is released, the urea, which has flowed backwards to the urea guide pipe 50, returns to the urea tank 10 through the urea injection line 12, and the urea, which is temporarily accommodated in the urea-overflow-preventing space 40, also returns to the urea tank 10 through the leveling line 14 (refer to FIG. 6).

Further, when the urea-overflow-preventing space 40 is completely filled with urea, a portion of the urea passes through the urea-passing hole 29-1 in the partition wall 29 and returns to the urea tank 10 through the return gap 56.

As is apparent from the above description, various aspects of the present invention are directed to providing a urea-filling device for diesel vehicles, in which a urea-overflow-preventing space is formed in a portion of a urea filler neck so that when a urea tank is completely filled with urea, the urea flowing backwards to the urea filler neck is temporarily accommodated in the urea-overflow-preventing space and returns to the urea tank, easily preventing urea from overflowing out of the urea filler neck.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. the exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A urea-filling device for a diesel vehicle, the urea-filling device comprising:
    a urea filler neck having a urea-injection-gun insertion hole formed in an upper portion thereof and connected at a lower portion thereof with a urea injection line and a leveling line; and
    a urea-overflow-preventing space formed in the urea filler neck to, for a predetermined time, accommodate urea that flows backwards from a urea tank, and
    wherein the urea filler neck includes a urea guide pipe mounted in a urea injection hole to guide urea flowing backwards through the urea injection line from the urea tank to the urea-overflow-preventing space,
    wherein the urea guide pipe has a urea guide wing integrally formed on an upper end portion thereof, and
    wherein the urea guide wing is bent vertically downwards from the upper end portion of the urea guide pipe and faces toward the urea-overflow-preventing space.

2. The urea-filling device of claim 1, wherein the urea filler neck further including:
    an upper case including the urea-injection-gun insertion hole formed in a portion thereof and an upper cover formed at an opposite portion thereof to form the urea-overflow-preventing space; and
    a lower case including the urea injection hole formed in a portion thereof to be connected to the urea injection line and a lower cover formed at an opposite portion thereof to be connected to the leveling line and to form the urea-overflow-preventing space.

3. The urea-filling device of claim 2, wherein the lower case further includes a partition wall integrally formed at a bottom thereof to separate the urea injection hole and the urea-overflow-preventing space from each other.

4. The urea-filling device of claim 3, wherein the partition wall has a urea-passing hole formed in an upper end portion thereof for the urea injection hole and the urea-overflow-preventing space to communicate with each other.

5. The urea-filling device of claim 1, wherein the urea guide pipe is formed to have a smaller diameter than a diameter of an upper end portion of the urea injection hole wherein a return gap is formed between an external circumferential surface of the urea guide pipe and an internal circumferential surface of the upper end portion of the urea injection hole.

6. The urea-filling device of claim 2, wherein the lower case has a stepped recess formed in an upper end portion thereof, and the urea guide pipe has a support protrusion formed at an upper end portion thereof to be seated on the stepped recess.

7. The urea-filling device of claim 2, wherein the upper case is provided with an injection gun guide pipe inserted into a lower end portion of the urea-injection-gun insertion hole to guide insertion of a urea injection gun.

8. The urea-filling device of claim 7, wherein the injection gun guide pipe has a pressing end portion integrally formed at an external periphery of a lower end portion thereof to press a support protrusion of the urea guide pipe.

\* \* \* \* \*